June 22, 1954 — G. S. DOW, JR., ET AL — 2,681,589
OPTICAL TRAFFIC SIGNAL VIEWER
Filed June 15, 1950

Inventors
Grove S. Dow, Jr. &
Howard L. Stone
By Willits, Helwig & Bailio
Attorneys Patented June 22, 1954

2,681,589

UNITED STATES PATENT OFFICE 2,681,589

OPTICAL TRAFFIC SIGNAL VIEWER

Grove S. Dow, Jr., Anderson, and Howard I. Slone, Alexandria, Ind., assignors to General Motors Corporation, Detroit, Mich., a corporation of Delaware Application June 15, 1950, Serial No. 168,228

3 Claims. (Cl. 88—1)

The present invention relates to optical devices and more particularly to a lens adapted for attachment to automotive vehicles for observing traffic signaling lamps.

As traffic signaling lamps are frequently placed in overhanging positions at traffic intersections, the vehicle operator's view of the lamp may be obscured by the cab structure. To afford the operator a view of the signaling condition of such lamps at all times it is desirable to provide means within the vehicle adapted to transmit light from the lamp to the operator's eye.

Accordingly, it is an object of the present invention to provide an improved optical device for viewing traffic signaling lamps indirectly from within the cab structure of automotive vehicles.

This and other objects are attained in accordance with the present invention by providing an optical device so constructed and arranged that traffic signal lamps are observable through the device over a substantially large range of interception angles.

Figure 1:
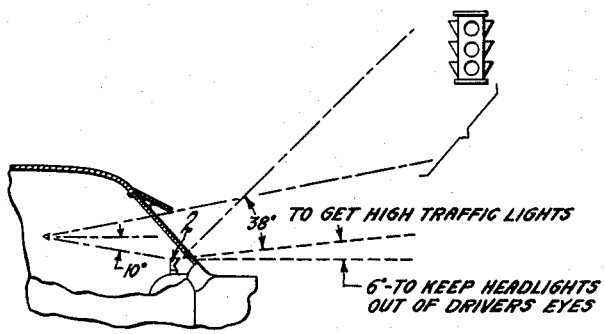
Figure 2:
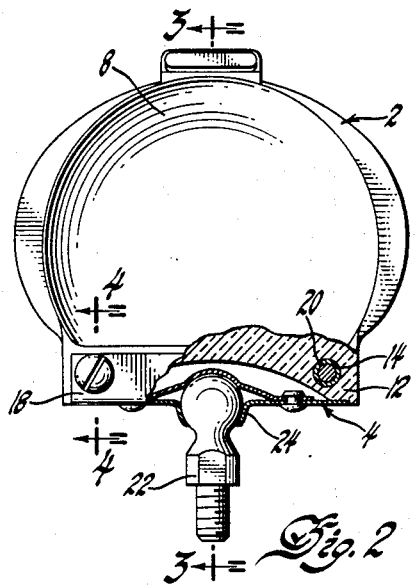
Figure 3:
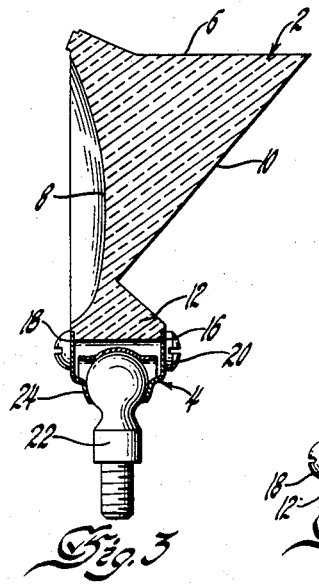
Figure 4:
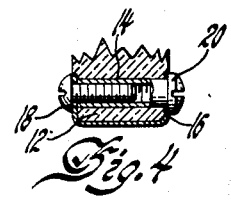
Figure 5:
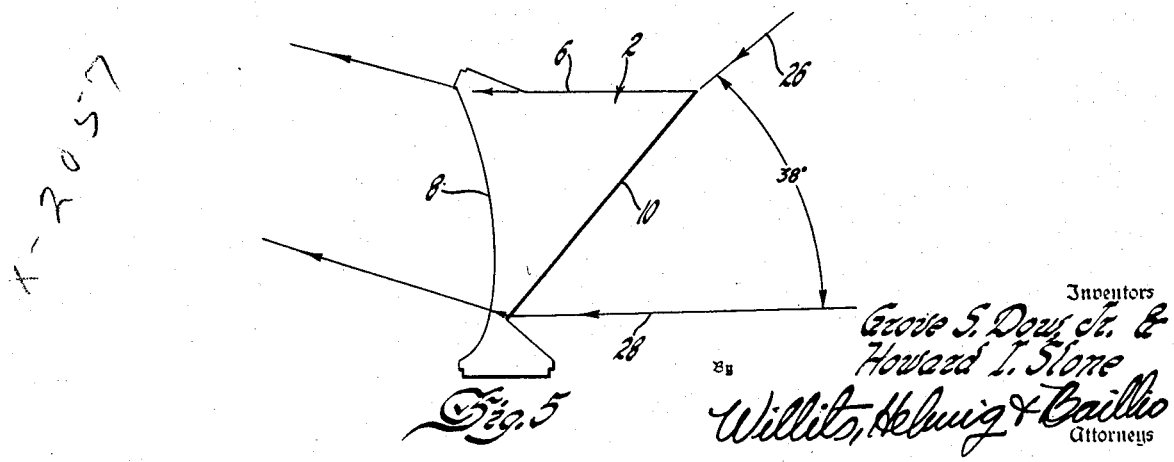

For a better understanding of the invention, reference may be had to the accompanying drawing in which Figure 1 is a fragmentary view in side elevation of an automotive vehicle illustrating a viewing device embodying the present invention, mounted on the horizontal portion of the dash panel; Figure 2 is a front view of the signal viewing device with parts broken away and in section; Figure 3 is a view taken along the line 3—3 of Figure 2; Figure 4 is a view taken along the line 4—4 of Figure 2 and Figure 5 is a view illustrating the optical diagram of the device.

Referring now to the drawing and particularly to Figure 1, there is illustrated a vehicle cab structure with parts broken away to illustrate a traffic signal viewer embodying the present invention, mounted on the horizontal dash panel of the vehicle. The viewer comprises a lens, a support for the lens and means for adjustably securing the lens and support to the dash panel of the vehicle. In the position shown, the lens characteristics of the viewer adapt it to intercept light from a light source such as overhanging traffic lamps within a vertical angle of substantially 38 degrees from a reference line angularly displaced vertically by about 6 degrees from the longitudinal axis of the vehicle. The viewer is mounted with the lower angular interception limit on a line angularly displaced from the longitudinal axis of the vehicle to avoid the transmission of light from an oncoming vehicle's headlights to the operator's eye. Further, the lens characteristics of the viewer are such that light transmitted by the viewer lens from an object within the interception angle will be directed upwardly to the eye of the vehicle operator along a path angularly displaced vertically from the longitudinal axis of the vehicle by an angle of substantially 10 degrees. To provide a suitable horizontal field of view, the lens is provided with the diverging characteristics of a plano-concave lens.

The traffic signal viewing device of the present invention is illustrated in detail in Figures 2, 3 and 4 and comprises a lens body 2 of a material having suitable light transmitting characteristics such as the polymerized methyl-methacrylate thermoplastic resin commonly known as "Lucite" mounted in a support 4.

The lens body 2 is provided with a boundary surface 6 which is substantially conical and concave and plane surfaces 8 and 10 respectively at opposite ends of the body. To provide optimum light transmission characteristics, the axis of curvature of concave surface 8 and the plane surface 10 are inclined to the cone axis. By forming surfaces 8 and 10 in this manner we have found that positioning of the viewing device so that it may be observed along the cone axis avoids the appearance of an image of the surface 6 to the operator of the vehicle.

The lens body 2 is formed with a projecting portion 12 having transverse passages 14 which is utilized for securing the body of the mounting 4.

The mounting 4 is a metal stamping provided with upwardly turned sides 16 and 18 which are recessed in the side walls of the projecting portion 12. Threaded fasteners 20 pass through the sides 16 and 18 and the passages 14 securing the lens body in the mounting. The mounting 4 is provided with a passage at substantially the center thereof adapted to receive a ball headed attaching member 22. An edge portion 24 of the mounting adjacent the passage is turned downwardly with a spherical seating surface adapted to frictionally engage the ball headed attaching member as shown. A spring secured at its ends by attaching rivets to the mounting 4 yieldingly urges the ball-headed attaching member into engagement with the spherical seating surface, as shown in Figures 2 and 3. With a mounting arrangement such as that described, it will be seen that the lens body is universally adjustable about the axis of the ball-headed attaching member.

The optical characteristics of the lens are diagrammatically illustrated in Figure 5 wherein a light ray 26 entering the body at its maximum interception angle is illustrated as being refracted at surface 10 along a path parallel with surface 6 and again refracted upwardly at surface 8. A ray 28 entering the body along a path parallel to the lower limit of the interception angle is likewise bent upwardly by refraction at both surfaces 8 and 10. With such a lens construction, an object such as a traffic signal appears to an operator as virtual, erect and diminished.

While the embodiment of the present invention as herein disclosed constitutes a preferred form, it is to be understood that other forms might be adopted all coming within the scope of the claims which follow.

What we claim as new and desire to secure by Letters Patent of the United States is:

1. A traffic signal viewing device comprising a generally wedge shaped lens body having a plane light entrance surface, an oppositely and angularly disposed concave viewing surface, a conical surface joining said plane and concave surfaces and tapering toward said concave surface and means for securing said lens body to a vehicle for universal movement thereon, said plane and said concave surfaces being disposed with respect to each other to gather light from within about a 38° vertical angle in front of said plane surface and direct the gathered light upwardly and behind said concave face at about a 10° vertical angle to the horizontal axis of the vehicle.

2. A traffic signal viewing device comprising a generally wedge shaped lens body having a plane light entrance surface, an oppositely and angularly disposed concave viewing surface, a conical surface joining said plane and concave surfaces and tapering toward said concave surface, a flat sided projecting portion integral with said lens body, a mounting having side walls abutting the sides of said projecting portion, means for securing said mounting to said projecting portion, and a vehicle attaching member secured to said mounting for universal movement therewith.

3. A traffic signal viewing device comprising a generally wedge shaped lens body having a plane light entrance surface, an oppositely and angularly disposed concave viewing surface, a conical surface joining said plane and concave surfaces and tapering toward said concave surface, a flat sided projecting portion on said lens body having transverse passages therethrough, a mounting having upwardly turned side walls abutting the sides of said projecting portion, threaded fasteners passing through said side walls and said transverse passages for securing said mounting to said projecting portion, and a vehicle attaching member secured in said mounting for universal adjustment therein.

References Cited in the file of this patent

UNITED STATES PATENTS

| Number | Name | Date |
|---|---|---|
| 1,678,479 | Patten | July 24, 1928 |
| 1,683,951 | Buttron | Sept. 11, 1928 |
| 1,731,284 | Andel et al. | Oct. 15, 1929 |
| 1,808,208 | David | June 2, 1931 |
| 1,883,296 | Johnson | Oct. 18, 1932 |
| 2,109,932 | Schneider | Mar. 1, 1938 |
| 2,114,767 | La Hodny et al. | Apr. 19, 1938 |
| 2,469,207 | Roedding | May 3, 1949 |
| 2,538,077 | Blosse | Jan. 16, 1951 |